3,216,949
WATER-SOLUBLE CORROSION INHIBITORS
Walter G. Toekelt, Downers Grove, and John P. Luvisi, Park Ridge, Ill., assignors to Universal Oil Products Company, Des Plaines, Ill., a corporation of Delaware
No Drawing.   Filed July 5, 1962, Ser. No. 207,766
7 Claims.   (Cl. 252—392)

This invention relates to novel water-soluble corrosion inhibitors and to use thereof in preventing corrosion of metallic surfaces upon contact with water.

Corrosion of metallic surfaces, particularly iron and steel, in contact with fresh or salt water or various aqueous solutions, results in a serious economical loss. The present invention provides improved water-soluble corrosion inhibitors which will retard and/or prevent such corrosion.

While the novel inhibitors of the present invention may be used in any system wherein water or aqueous solutions contact metallic surfaces, the following specific examples are set forth as illustrative, but not limiting, instances in which the inhibitors of the present invention are useful. Storage tanks, pipe lines and the like containing petroleum oils or other organic compounds generally contain water which causes corrosion of the metallic surfaces. For example, in storage tanks the water settles to the bottom and causes corrosion of the internal surfaces of the storage tank. The water-soluble corrosion inhibitor of the present invention will dissolve in the water phase and will serve to retard and/or prevent such corrosion. Another example is in the stamping, rolling or other working of metal in which a water stream is sprayed or otherwise used as a coolant. Because these operations are effected at high temperature, the cooling water often causes extensive corrosion. Such corrosion is avoided by incorporating the corrosion inhibitor of the present invention in the water spray. Still another application is in the salt-ice water solutions used as refrigerants, for example, in railroad cars, trucks, etc. When used in railroad cars, the salt solution not only effects corrosion of the railroad cars, but also drips onto the rails and causes corrosion thereof. It is readily seen that such corrosion is a serious economical problem because it requires frequent replacement of rails, which is expensive both in manpower and in material cost. Still other applications include boiler water, acid solutions such as pickling solutions, etc.

Heretofore, one of us has shown that effective corrosion inhibitors may be prepared by the reaction of tetrahydroxyalkyl alkylenepolyamines with phytic acid. Now we have found that effective water-soluble corrosion inhibitors may be prepared when using amines which do not contain hydroxyl groups in their molecules. In addition to this important discovery, the present invention provides an alternative means of preparing effective water-soluble corrosion inhibitors.

The novel corrosion inhibitor of the present invention is the reaction product of an amine containing from about 6 to about 30, and preferably from about 10 to about 20, carbon atoms with phytic acid. Any suitable amine may be used in accordance with the present invention and may comprise a primary or secondary monoamine or polyamine. Illustrative preferred primary monoamines include hexyl amine, heptyl amine, octyl amine, nonyl amine, decyl amine, undecyl amine, dodecyl amine, tridecyl amine, tetradecyl amine, pentadecyl amine, hexadecyl amine, heptadecyl amine, octadecylamine, nonadecyl amine, eicosyl amine, etc.

Illustrative preferred secondary monoamines include dipropyl amine, dibutyl amine, diamyl amine, dihexyl amine, diheptyl amine, dioctyl amine, dinonyl amine, didecyl amine, etc.

Illustrative primary polyamines, which also contain a secondary amino group, include N-hexyl-ethylenediamine, N-heptyl-ethylenediamine, N-octyl-ethylenediamine, N-nonyl-ethylenediamine, N-decyl-ethylenediamine, N-undecyl-ethylenediamine, N-dodecyl-ethylenediamine, N-tridecyl-ethylenediamine, N-tetradecyl-ethylenediamine, N-pentadecyl - ethylenediamine, N - hexadecyl - ethylenediamine, N-heptadecyl-ethylenediamine, N-octadecyl-ethylenediamine, etc., N-amyl-1,3-diamino propane, N-hexyl-1,3-diamino propane, N-heptyl-1,3-diamino propane, N-octyl-1,3-diamino propane, N-nonyl-1,3-diamino propane, N-decyl-1,3-diamino propane, N-undecyl-1,3-diamino propane, N-dodecyl-1,3-diamino propane, N-tridecyl-1,3-diamino propane, N-tetradecyl-1,3-diamino propane, N-pentadecyl-1,3-diamino propane, N-hexadecyl-1,3-diamino propane, etc., N-butyl-1,4-diamino butane, N-pentyl-1,4-diamino butane, N-hexyl-1,4-diamino butane, N-heptyl-1,4-diamino propane, N-octyl-1,4-diamino butane, N-nonyl-1,4-diamino butane, N-decyl-1,4-diamino butane, N-undecyl-1,4-diamino butane, N-dodecyl-1,4-diamino butane, etc. Other amines include the N-alkyl-1,2-diamino propanes, N-alkyl-1,2-diamino butanes, N-alkyl-1,3-diamino butanes, etc. in which the alkyl group contains from about 4 to about 25 carbon atoms. Additional alkylenepolyamines, containing both a primary and a secondary alkyl group, include N-alkyl-diethylenetriamine, N-alkyl-dipropylenetriamine, N-alkyl-dibutylenetriamine, N-alkyl-triethylenetetramine, N-alkyl-tripropylenetetramine, N-alkyl - tributylenetetramine, N-alkyl-tetraethylenepentamine, N-alkyl-tetrapropylenepentamine, N-alkyl-tetrabutylenepentamine, etc., in which the alkyl group contains from about 4 to about 25 carbon atoms.

Illustrative secondary polyamides include $N^1,N^3$-dialkyl-diethylenetramines in which the alkyl groups contain from about 4 to about 25 carbon atoms each, $N^1,N^4$-dialkyl-triethylenetetramines in which the alkyl group contains from about 4 to about 25 carbon atoms each and $N^1,N^5$-dialkyl-tetraethylenepentamines in which the alkyl groups contain from about 4 to about 25 carbon atoms each. It is understood that alkyl substituents also may be attached to the other nitrogen atoms, when desired.

In general, the alkyl amines as hereinbefore set forth are preferred. However, in another embodiment of the invention, aromatic amines may be used including, for example, N-butylaniline, N-pentylaniline, N-hexylaniline, N-heptylaniline, N-octylaniline, N-nonylaniline, N-decylaniline, N-undecylaniline, N-dodecylaniline, N-tridecylaniline, N-tetradecylaniline, N-pentadecylaniline, etc. Other aromatic amines include ortho, meta or para phenylenediamines and particularly N,N'-dialkyl-p-phenylenediamines in which the alkyl groups contain from about 4 to about 25 carbon atoms each, N-alkylaminodiphenylamines and N,N'-dialkylaminodiphenylamines in which the alkyl group contains from 4 to about 25 carbon atoms. In still another embodiment a cycloaliphatic amine may be used including, for example, N-butyl-cyclohexylamine, N-pentyl-cyclohexylamine, N-hexyl-cyclohexylamine, N-heptyl - cyclohexylamine, N-octyl - cyclohexylamine, N-nonyl-cyclohexylamine, N-decyl-cyclohexylamine, N-undecyl-cyclohexylamine, N-dodecyl-cyclohexylamine, N-tridecyl-cyclohexylamine, N-tetradecyl-cyclohexylamine, N-pentadecyl-cyclohexylamine, etc.

In general, it is preferred that the alkyl group attached to the nitrogen atom is a secondary alkyl group. The secondary alkyl group is obtained by reductive alkylation of the amine with a ketone. The reductive alkylation is effected at a temperature of from about 100° to about 500° F. and a hydrogen pressure of from about 25 to about 1000 pounds per square inch or more in the presence of a suitable catalyst. Suitable catalysts include those containing nickel, platinum, palladium, cobalt, molybdenum, etc. However, when a normal alkyl group is desired, it may be prepared by the reductive alkylation method using an aldehyde as one of the reactants.

From the hereinbefore description, it will be seen that a number of different amines may be used for reaction with phytic acid. It is understood that all of these reaction products are not necessarily equivalent and that the amine will be selected with regard to the particular system in which the inhibitor is to be employed.

The reaction of the amine and phytic acid is effected using from about 0.5 to about 6 and preferably from about 1 to about 4 mole proportions of the amine per 1 mole proportion of phytic acid. The reaction is readily effected at atmospheric temperature, although an elevated temperature, which generally will not exceed about 100° C., may be employed. When a higher temperature is used, the reaction preferably is effected under superatmospheric pressure in order to maintain the reactants in substantially liquid phase.

The reaction product is utilized as such or as an aqueous solution. When desired, the reaction product may be dissolved in other solvents as, for example, alcohols, ketones, aldehydes, etc.

In another embodiment the reaction product is formed in situ. The amine and phytic acid, in the desired mole proportions, are commingled, either separately or together, with the substrate, preferably accompanied with suitable agitation in order to effect reaction of the amine and phytic acid in situ.

The exact composition of the reaction product has not been determined. Without any intention of being limited thereto, it is believed that the reaction product comprises a salt, although it may consist of or comprise esters or mixtures of salts and esters. Regardless of the specific composition of the reaction product, it has been determined that the reaction product is an effective corrosion inhibitor.

As hereinbefore set forth, the reaction product prepared in the above manner is utilized as a water soluble corrosion inhibitor. The reaction product is incorporated in water, aqueous solutions or substrates containing water in a sufficient concentration to effectively retard corrosion of metallic surfaces. Generally, it will be utilized in a concentration of below about 2% by weight of the water, aqueous solution or substrate containing water, and more particularly in a concentration within the range of from about 0.001% to about 1% and still more particularly of from about 0.01% to about 0.5% by weight thereof, although higher concentrations may be employed when excessive corrosion is encountered. It is understood that the corrosion inhibitor may be used in conjunction with other additives which are incorporated in the substrate for various reasons.

The following examples are introduced to illustrate further the novelty and utility of the present invention but not with the intention of unduly limiting the same.

Example I

A series of runs were made as follows: A solution of 2 g. of the amine, 2 g. of 70% phytic acid solution and 396 g. of deionized water was prepared. It will be noted that the reaction product is present in a total of 4 g., which corresponds to 1% by weight of the 400 g. total solution.

A strip of plain carbon sheet steel was immersed in the solution and maintained therein with one-eighth of the length of the metal strip being above the solution. The strip remained in the solution for approximately seven weeks.

A blank or control run was made in the same manner as described above, except that the amine and phytic acid were not added to the deionized water. After seven weeks, the strip lost 44 mg. in weight.

Another run was made in the same manner as described above, except that the deionized water contained 2 g. of $N^1,N^3$-di-(1-ethyl-3-methylpentyl)-diethylenetriamine and 2 g. of 70% phytic acid solution. The resulting solution was a homogeneous solution. The steel strip, immersed in this solution in the same manner described above, lost only 8.6 mg. in weight after immersion for about seven weeks.

From the above data it will be seen that the corrosion inhibitor of the present invention was very effective in retarding corrosion of the steel strip.

Example II

This example was conducted in the same manner as described in Example I, except that the corrosion inhibitor comprised bis-(1-ethyl-3-methylpentyl) - amine [dioctyl amine]. As before, 2 g. of this amine and 2 g. of 70% phytic acid solution were dissolved in 396 g. of deionized water. The steel strip immersed in this solution for about seven weeks showed a loss in weight of only 7.7 mg. Here again, it will be seen that the inhibitor of the present invention was very effective in retarding corrosion.

Example III

This example was conducted in the same manner as described in Examples I and II, except that the amine used in this example was N,N'-di-(1-methylheptyl)-ethylene-diamine. 2 g. of this amine and 2 g. of 70% phytic acid solution were dissolved in 396 g. of deionized water. A steel strip was immersed in this solution in the same manner as hereinbefore described. After about seven weeks, the steel strip lost only 6.6 mg. in weight, in contrast to the 44 mg. loss in weight of the steel strip immersed in the deionized water not containing an inhibitor.

Example IV

The inhibitor of this example was prepared by the reaction of equal mole proportions of N-sec-butylaniline and phytic acid. When evaluated in the same manner as described in the previous examples, the loss in weight of the steel strip is considerably less than the 44 mg. obtained in the absence of the inhibitor.

Example V

The inhibitor of this example is prepared by the reaction of equal mole proportions of hexyl amine and phytic acid. The reaction is effected by mixing the reactants at room temperature with intimate stirring. The resulting product is evaluated as a corrosion inhibitor in the same manner as described in Example I. This serves to reduce a loss of weight encountered during contact of the metal surface with water containing acidic corrodants.

Example VI

The inhibitor of this example is prepared by the reaction of 2 mole proportions of N.N'-di-sec-octyl-p-phenylenediamine with 1 mole proportion of phytic acid. The reaction is effected by intimately mixing the reactants at room temperature. The resultant product is evaluated as a corrosion inhibitor in the same manner as described in Example I and serves to retard corrosion of the steel strip.

We claim as our invention:
1. The method of retarding corrosion of a ferrous metal surface upon contact with water containing an acidic corrodant, which comprises effecting said contact in the presence of a water-soluble corrosion inhibitor comprising the product formed by the reaction of one mole proportion of phytic acid with from about 0.5 to about 6 mole proportions of an amine consisting of carbon, hydrogen and nitrogen and containing from about 6 to about 30 carbon atoms per molecule.
2. The method of retarding corrosion of a ferrous metal surface upon contact with water containing an acidic corrodant, which comprises effecting said contact in the presence of a water-soluble corrosion inhibitor comprising the product formed by the reaction of one mole proportion of phytic acid with from about 1 to about 4 mole proportions of dialkylalkylenepolyamine consisting of carbon, hydrogen and nitrogen and containing from 2 to 5 amine groups and from about 6 to about 30 carbon atoms per molecule.

3. The method of retarding corrosion of a ferrous metal surface upon contact with water containing an acidic corrodant, which comprises effecting said contact in the preesnce of a water-soluble corrosion inhibitor comprising the product formed by the reaction of from about 1 to about 4 mole proportions of N,N'-dioctylethylenediamine with 1 mole proportion of phytic acid.

4. The method of retarding corrosion of a ferrous metal surface upon contact with water containing an acidic corrodant, which comprises effecting said contact in the presence of a water-soluble corrosion inhibitor comprising the product formed by the reaction of from about 1 to about 4 mole proportions of $N^1,N^3$-dialkyldiethylenetriamine containing from about 6 to about 30 carbon atoms with 1 mole proportion of phytic acid.

5. The method of retarding corrosion of a ferrous metal surface upon contact with water containing an acidic corrodant, which comprises effecting said contact in the presence of a water-soluble corrosion inhibitor comprising the product formed by the reaction of from about 1 to about 4 mole proportions of $N^1,N^3$-dioctyldiethylenetriamine with 1 mole proportion of phytic acid.

6. The method of retarding corrosion of a ferrous metal surface upon contact with water containing an acidic corrodant, which comprises effecting said contact in the presence of a water-soluble corrosion inhibitor comprising the product formed by the reaction of from about 1 to about 4 mole proportions of dialkyl amine containing from about 6 to about 30 carbon atoms with 1 mole proportion of phytic acid.

7. The method of retarding corrosion of a ferrous metal surface upon contact with water containing an acidic corrodant, which comprises effecting said contact in the presence of a water-soluble corrosion inhibitor comprising the product formed by the reaction of from about 1 to about 4 mole proportions of dioctyl amine with 1 mole proportion of phytic acid.

References Cited by the Examiner
UNITED STATES PATENTS

| | | | |
|---|---|---|---|
| 2,626,238 | 1/53 | Artz | 260—461.303 |
| 2,750,400 | 6/56 | Cowan et al. | 260—461.303 |
| 2,871,190 | 1/59 | Finlayson et al. | 260—461.303 |
| 2,923,599 | 2/60 | Toekelt | 21—2.7 |
| 3,019,226 | 1/62 | Bernstein et al. | 260—461.303 |
| 3,062,612 | 11/62 | Le Boucher | 252—390 XR |

JULIUS GREENWALD, *Primary Examiner.*

ALBERT T. MEYERS, *Examiner.*